Figure 1:
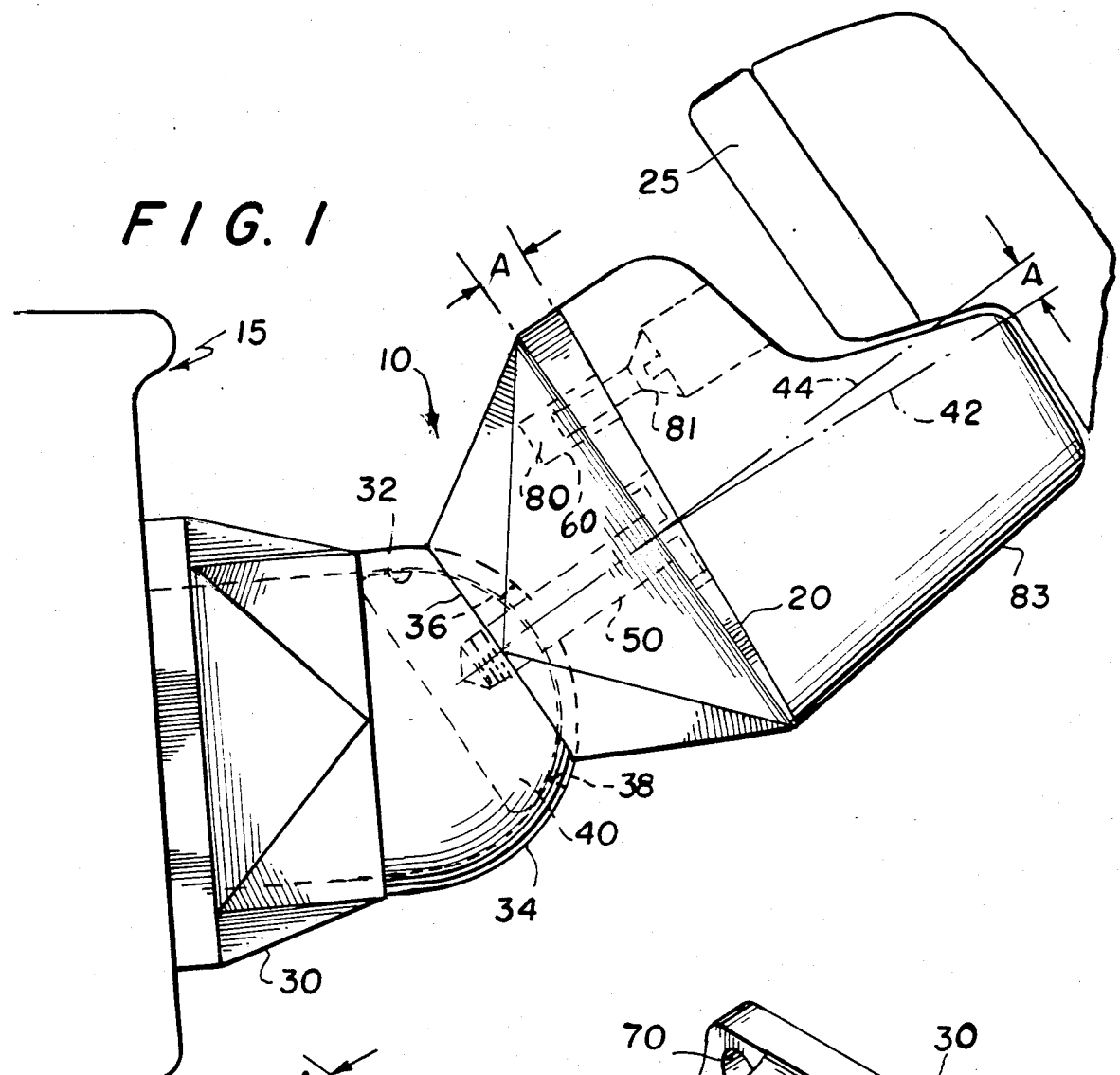

United States Patent [19]

Bryant

[11] Patent Number: 4,617,430
[45] Date of Patent: Oct. 14, 1986

[54] SWIVEL MOUNT

[75] Inventor: David V. Bryant, Lynchburg, Va.

[73] Assignee: General Electric Company, Lynchburg, Va.

[21] Appl. No.: 601,931

[22] Filed: Apr. 19, 1984

[51] Int. Cl.$^4$ .................. H04M 1/04; H04M 1/12; A47F 5/08

[52] U.S. Cl. .................. 179/146 R; 179/148 R; 381/86; 248/288.3

[58] Field of Search .............. 179/146 R, 148 R, 149, 179/178, 153; 381/86, 87, 60; 248/288.3, 288.5

[56] References Cited

U.S. PATENT DOCUMENTS

| 357,337 | 2/1887 | Rosenblatt | 179/146 |
|---|---|---|---|
| 377,995 | 2/1888 | Dougherty | 248/288.5 |
| 590,044 | 9/1897 | Maschmeyer | 248/288.5 |
| 1,615,621 | 1/1927 | Goodnow | 248/288.3 |
| 2,465,751 | 3/1949 | Robins | 248/288.3 |
| 2,875,973 | 3/1959 | Hall | 248/288.3 |
| 4,066,231 | 1/1978 | Bahner et al. | 248/288.3 |
| 4,159,092 | 6/1979 | DeLano | 248/288.5 |
| 4,215,250 | 7/1980 | Resener | 179/149 |
| 4,238,152 | 12/1980 | Fukino | 248/288.5 |
| 4,445,228 | 4/1984 | Bruni | 381/86 |

FOREIGN PATENT DOCUMENTS

| 1017328 | 12/1952 | France | 248/288.5 |
|---|---|---|---|
| 2398214 | 2/1979 | France | 248/288.3 |

Primary Examiner—Gene Z. Rubinson
Assistant Examiner—Danita R. Byrd
Attorney, Agent, or Firm—Nixon & Vanderhye

[57] ABSTRACT

A swivel mounting base utilizes a locking screw with a spherical nut to permit lock-in of a mounting surface at a desired position relative a mounting base. The mounting base is suitable for mounting on a hump or dash of a vehicle. The mounting surface is adapted to permit attachment of a user-device (such as a cellular radiotelephone control unit handset) to it. With use of a preferred embodiment, a user may attach the swivel mount at a desired point in a vehicle and rigidly position the user-device at a desired position relative to the mounting base. A fixed increment of tilting may be selectively rotated to any desired orientation so as to increase the maximum possible tilt adjustment.

7 Claims, 2 Drawing Figures

U.S. Patent  Oct. 14, 1986  4,617,430

SWIVEL MOUNT

This invention relates to a swivel mount. It is particularly adapted for personalized convenience mounting of a user-device (e.g. a control unit handset for a cellular radio) to the interior of a motor vehicle (e.g. on the dash or hump).

It is well known to mount mobile radio telephone handsets in stationary hangers or cradles. It is also known to utilize conventional swivel mounts in many different environments including the support of mobile radio devices in vehicle interiors. For example, some examples of such prior art are listed below.

U.S. Pat. No. 1,615,621—Goodnow (1927)
U.S. Pat. No. 2,465,751—Robins (1949)
U.S. Pat. No. 4,066,231—Bahner et al (1978)

Bahner et al discloses a swivel joint to permit the locking of a small, portable device to a table (or other relatively non-portable object). FIGS. 9 and 10 of Bahner et al disclose such a swivel mount for use inside a vehicle.

Robins discloses a swivel joint for adjustably mounting a rear view mirror and having an exposed screw to positively lock-in the desired mirror position.

Goodnow discloses a corrugated dome which is selectively positioned to match corrugations on a casting, and then held in the selected discrete position by the tightening of a bolt.

Although such prior conventional swivel mounts might be employed to mount the control unit handset of a cellular radio telephone inside a vehicle, they are not believed ideally suited to this task.

I have now discovered a novel swivel mount which is believed to be an improvement over typical conventional swivel mounts (such as those referenced above). It is especially suitable for mounting the handset of a cellular radio telephone to available interior surfaces of a vehicle such as the dash or "hump". It accommodates the different angles of dashboards or other mounting surfaces allowing any particular user to custom-align the control surfaces (e.g. keypad and LCD digits) for his/her best (and safest) visibility and convenience. This is especially important in the context of mobile radio telephone units (to be used in any make or model of vehicle) which may require access/use by the drive of a vehicle then in motion on busy streets and highways. In the case of stressful applications (e.g. police or fire departments), convenience and safety factors may become especially critical to life.

In brief simplified summary, my new swivel mount includes a molded base with a protruding spherical surface and a mounting plate having a matching spherical depression. These two pieces are drawn together by a threaded screw passing through the mounting plate and into a spherical nut retained inside the base within a spherical chamber. The whole assembly thus includes four nested mating and concentric spherical surfaces which can be selectively clamped together in any desired position. When a desired relative position of the base and mounting plate is at hand, the screw is tightened to positively lock (or at least frictionally engage) the assembly into this desired position. In one type of use, the locking screw is inaccessible after installation.

The mounting surface of the mounting plate component is preferably formed with its normal angularly disposed with respect to the adjustment axis (e.g. along the centerline of the lock screw) of the spherical swivel mount. Thus an additional increment of tilt is available and may be utilized, for example, by preferential mounting of the base to the vehicle surfaces.

The exemplary embodiment thus permits the mounting of a cellular radio handset at any desired location within a vehicle, and at any desired position of the mounting surface relative to the mounting base. Thus, a greater degree of convenience and safety is offered. This mounting system permits each user to select the position most suitable for his or her operation of the attached device with the greatest degree of safety. Safety is enhanced by the increased degree of ease with which a user operates an attached device by virtue of the immediate user having been the one to select the final mounting position of the device.

Figure 2:
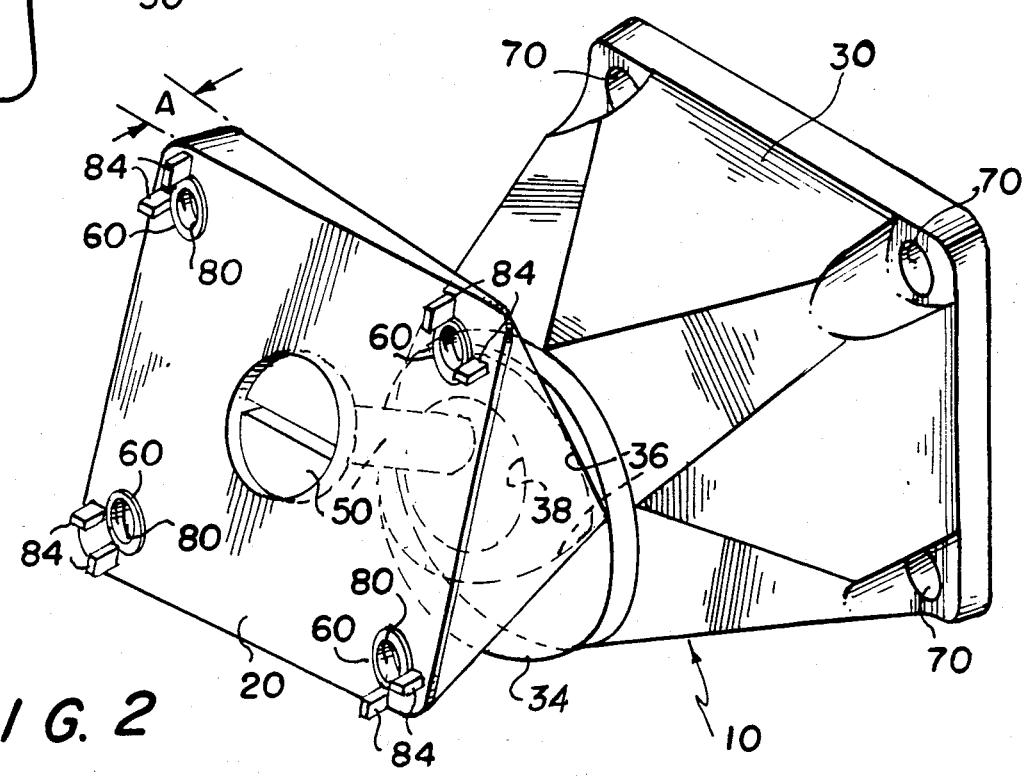

These as well as other features and advantages of this invention may be better understood by reading the following detailed description of the presently preferred exemplary embodiment and the accompanying drawings, in which:

FIG. 1 is a partially transparent side view of a presently preferred embodiment of the present invention; and FIG. 2 is an alternate, also partially transparent perspective view of the embodiment shown in FIG. 1.

In FIGS. 1 and 2, a swivel mount 10 is shown which permits continuous motion of a mounting surface 20 relative to a base 30. Both the mounting surface and base are, in the exemplary embodiment, made of molded plastic. The base 30 includes a hollow spherical chamber 32 and also has a protruding external concentric spherical surface 34. The mounting surface 20 includes a mating concave spherical surface 36 (by virtue of its spherical depression) which matches and is adjacent to (i.e., concentric with) the convex spherical surface 34 of the hollow base 30. A spherical nut 40 resides within the spherical chamber 32 of the hollow base. The surface of the spherical nut matches and is adjacent to (i.e. also concentric with) the concave spherical surface 34 of the hollow base. A locking screw 50 passes through the mounting surface 20 and a relatively wide aperture 38 (to permit adjustments) in the hollow base where it is engaged by the spherical nut 40. The structure of FIG. 1, therefore, constitutes a swivel mount which permits continuous motion of the mounting surface 20 relative to the hollow base 30 (within the limits of aperture 38). Aperture 38 is two or three times larger than screw 50 so as to permit, in the exemplary embodiment, 30° off-axis movement of the screw in all directions. Aperture 38 is centered about the axis of the cylinder exit portion of the concave spherical cavity of the hollow base. The head of the locking screw does not pass through the aperture 38 because the head is limited in its inward travel by the narrow opening in the face of the mounting surface 20 (refer to the Figures).

FIG. 2 is an alternate view of FIG. 1 which shows additional features of the present invention. The elements 60 on the mounting surface 20 are used to attach something (e.g. a holder for a radio telephone handset) to the mounting surface 20. They may comprise threaded inserts 80 in elements (holes) 60 for screwing by means of 81 a holder 83 or other retaining object to the mounting surface 20. Projections 84 (a total of eight) are on the face of mounting surface 20 (with matching indentations in holder 83). These projections facilitate quick and simple registration of holder 83 with the mounting surface 20. Since the projections are symmetrical around the center of surface 20, holder 83 may be oriented in any one of four positions on the mounting surface 20. Of course, any other type of mounting plate may be secured to mounting surface 20 in place of holder 83. Such plates might accomodate different types of mobile telephones, or some other types of devices. These plates would also have matching indentations for quick mounting on the projections 84 of mounting surface 20. (FIG. 1 shows in dotted line a telephone handset receiving cradle or holder 83 for a cradled user-device 25 so attached to the surface 20.) The holes 70 in the base 30 may be used to attach the base 30 to some desired place (e.g. a larger object such as a vehicle). FIG. 2 shows the relative placement of all four pairs of elements 60 and inserts 80. These inserts permit the inclusion of metal threads in an otherwise plastic base. Additionally, they may be of some other construction than threaded, e.g. such as a bayonet mount. These inserts may be ultrasonically mounted or heat-welded into mounting surface 20 to securely attach them with the main unit. A means 81, from holder 83 or other attached object, would be associated with each 60/80 pair. FIG. 2 further demonstrates access by a user to the locking screw 50 through the top of the mounting surface 20 before it is made inaccessible after being covered by the device mounted to surface 20 using elements 60 and inserts 80.

To utilize the present invention, the hollow base 30 would be attached to a desired object 15 (such as the interior of a vehicle) at a point of maximum convenience as selected by the user. The swivel 10 would then be positioned as desired for a user-device attachment to the mounting surface 20. Once the desired position is established, the locking screw 50 may be tightened sufficiently to thereafter rigidly fix the position of the mounting surface relative to the hollow base. Alternatively, the locking screw 50 may be tightened only sufficiently to make further adjustment movements difficult. Then, the user-device (such as a cellular radio handset holder or cradle) would be mounted on the mounting surface. Thus, a user (through utilization of the present invention) would be able both to locate within a vehicle a desired user-device and to establish a desired position for the user-device relative to the mounting base.

As may be seen in FIGS. 1 and 2, the normal line 42 of the mounting surface 20 is permanently tilted by an angle A from the swivel adjustment axis 44 (e.g. the centerline of locking screw 50). Stated differently, the normal line 42 is at an angle with respect to the radius 44 of the four assembled concentric spherical surfaces. This added increment of tilt provides an increased maximum tilt angle (i.e. beyond that made possible by the limits of aperture 38 through which adjustment screw 50 passes). Such added possible tilt may be oriented as desired for a particular installation by rotation of the base 30 and/or the mounting surface 20. In one embodiment, the added increment of tilt A is on the order of 7°.

Should the user desire a change of the position, the user-device is removed from the mounting surface and the swivel repositioned by first disengaging the locking screw from the spherical nut. Once the new desired position is established, the locking screw could then be again tightened onto the spherical nut to again fix the mounting surface in its new desired location. The user-device would then be replaced on the mounting surface. This feature discourages alteration of the adjustment once an optimum position has been found for a particular user.

The hollow base may, of course, also be relocated to a different point within the vehicle (or other attached object), should such be desired. Elements other than the base (e.g., holder 83) may also be of hollow or honeycombed construction to meet necessary weight or strength considerations.

Although only one exemplary embodiment has been described in detail, those skilled in the art will appreciate that many variations and modifications may be made in this embodiment without departing from the advantages and novel features of the present invention. Therefore, all such modifications and variations are intended to be included within the scope of the appended claims.

What is claimed is:

1. A swivel mount, comprising:
    three separate elements including (1) a base element having a projecting convex spherical surface and a mating concentric interior spherical cavity with an aperture extending therethrough to said projecting convex spherical surface, (2) a mounting element having a concave spherical depression surface matching said projecting convex spherical surface of the base element and (3) a spherical element matingly housed within said interior spherical cavity of the base element;
    means, passing through said aperture in said base element, (1) for engaging said mounting element and said spherical element and (2) for permitting selective movements of said mounting element toward said spherical element to thereby selectively secure said three elements into a selected orientation with respect to each other;
    said mounting element including mounting holes therein for attaching a device thereto; and
    said mounting element and said spherical element being movable in tandem relative to said base element when engaged though not secured by said means.

2. A swivel mount as in claim 1, wherein said tandem motion, permitted relative to said base element when said means is disengaged, is continuously adjustable.

3. A swivel mount, comprising:
    three separate elements including (1) a base element having a projecting convex spherical surface and a mating concentric interior spherical cavity with an aperture extending therethrough to said projecting convex spherical surface, (2) a mounting element having a concave spherical depression surface matching said projecting convex spherical surface of the base element and (3) a spherical element matingly housed within said interior spherical cavity of the base element;
    means, passing through said aperture in said base element, (1) for engaging said mounting element and said spherical element and (2) for permitting selective movements of said mounting element toward said spherical element to thereby selectively secure said three elements into a selected orientation with respect to each other;
    said base element being rigidly fixed to a larger structure, and wherein a user-device attached to said mounting element is selectively positionable relative to said larger structure.

4. A swivel mount as in claim 3, wherein
    said base element and mounting element comprise molded plastic;
    a mobile telephone handset is attached to said mounting element; and said larger structure is the interior of a vehicle.

5. A swivel mount providing an adjustable platform for a removable user-device, said swivel mount comprising:
- a hollow base having a protruding convex spherical surface and a concentric spherical surface disposed therebelow in a cavity with an aperture therethrough to said protruding convex spherical surface;
- a mounting element having a concave spherical depression which matches and is adjacent to said convex spherical surface of the base element;
- a cradle mounted on said mounting surface for receiving said removable user-device thereon;
- a spherical nut contained within said cavity which matches and is adjacent to the cavity's said concentric spherical surface; and
- a locking screw engaged with said mounting member and passing through said aperture which, when threadably engaged with said nut, fixes said base element and said mounting element relative to each other.

6. A swivel mount as in claim 5, wherein said base and said mounting comprise molded plastic; and
said user-device is a mobile telephone handset.

7. A swivel mount as in claim 5, wherein
said mounting element has a mounting surface inclined with a fixed increment of tilt relative to an imaginary surface normal to the axis of said screw whenever said base and said mounting element are fixed relative to each other.

* * * * *